UNITED STATES PATENT OFFICE.

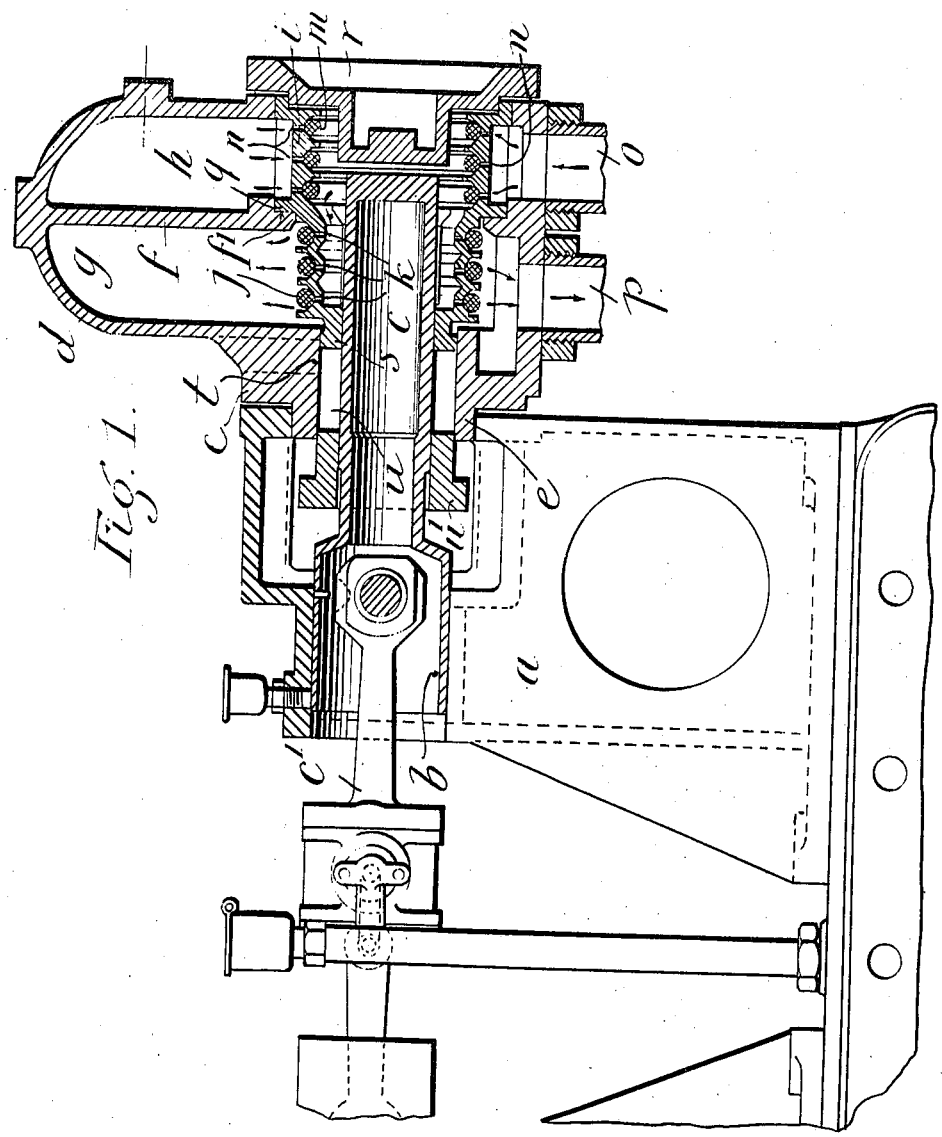

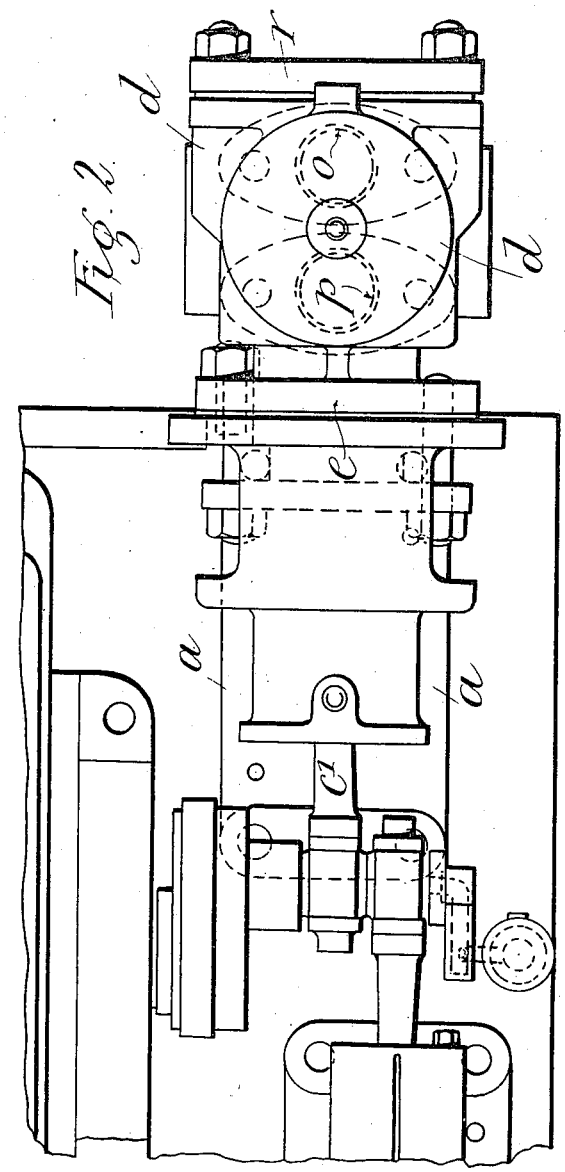

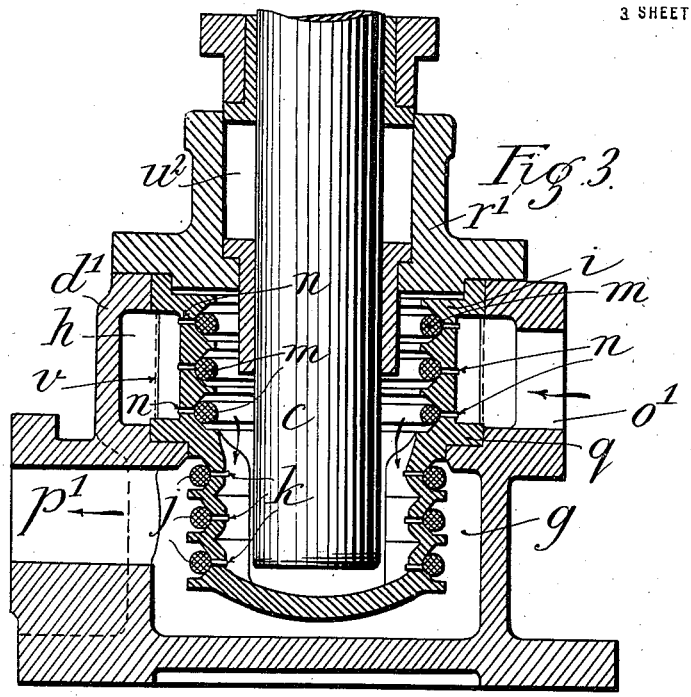
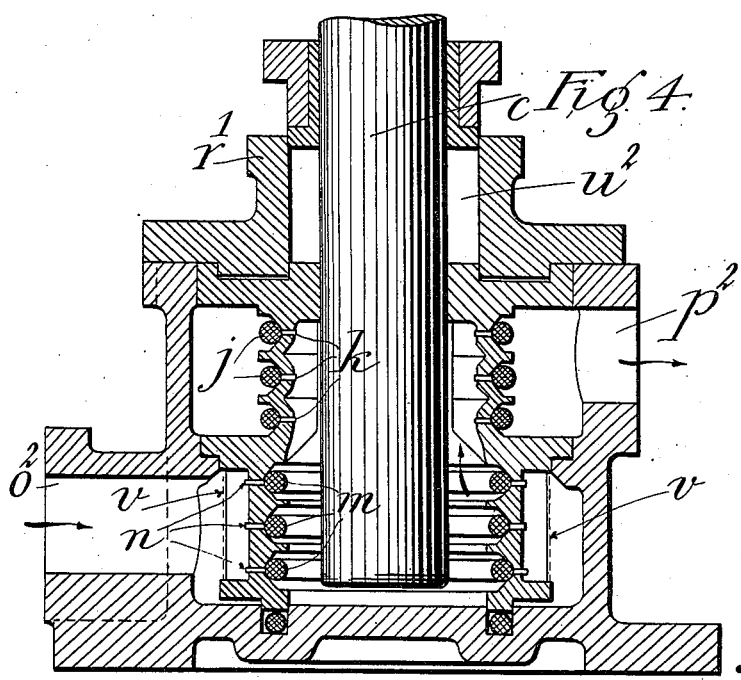

JÖRGEN BJÖRNSTAD, OF READING, ENGLAND.

RECIPROCATING PUMP.

1,413,568. Specification of Letters Patent. Patented Apr. 25, 1922.

Application filed March 19, 1921. Serial No. 453,664.

*To all whom it may concern:*

Be it known that I, JÖRGEN BJÖRNSTAD, a subject of the King of Great Britain and Ireland, residing at Reading, in the county of Berks, England, have invented Improvements in or Relating to Reciprocating Pumps, of which the following is a specification.

This invention relates to pumps embodying a reciprocating plunger or plungers with which are associated suction and delivery valves, the principal object being to produce a high speed pump adapted to be either direct coupled to a high speed engine or electric motor, or to be driven from such motive power, by a minimum of gearing and without noise. Other features of the invention are concerned with constructional details as will hereinafter be explained.

The feature of primary importance is the utilization of elastic members of annular form working compressively as suction valves, so that the same advantages are obtainable in dealing with entering liquid as with the delivery of liquid through elastic annular valves working under tension, which is sometimes done.

According to one example, valve rings may be employed which are circular in cross section adapted to be received by annular seatings of an angular shape in cross section and slotted circumferentially.

Advantageously, valve rings of the same size may be used for both the suction and delivery of the pump, such rings being thereby interchangeable. The seatings for the delivery valve rings may be constituted by a series of grooves turned upon the exterior of a circular body, the diameter of the seatings being such as to cause a slight initial extension of the rings. In the same way, the seatings for the suction valve rings may be turned upon the interior of the body aforesaid at a different axial position, their diameter being such as to produce a slight initial compression of the rings.

The arrangement is such that the fluid being pumped will pass through the slits in the valve seats and to each side of the elastic rings and as the slits can be made very narrow, it follows that the elastic rings will leave the seats only to a very small extent, since this is not a regular lift, as in the case of ordinary valves, but a compression and extension of the rubber or like material itself, which does not represent a momentum imparted to the valves. Consequently, the movement of the valves off and on to the seats can be effected very rapidly so that they will respond to very rapid reciprocating movements of the plunger.

The seats for both suction and delivery valves, as already stated, are preferably made in one casting which may be provided with external and internal longitudinal ribs to give the necessary strength after the slits are cut to form the passages for the fluid.

Such an integral valved member is advantageous in that it may be formed at one end as or with a bush arranged to extend into and constitute the bottom or inner end of a stuffing box through which the plunger works, an intermediate circumferential collar upon the exterior of the member being arranged to engage and make a good joint with a partition separating the suction and delivery chambers of the pump. The valved member can be inserted in position through an opening in the pump casing and be held in position firmly against the partition aforesaid by an independent cover adapted to bear against the member.

The pump housing is preferably so constructed as to form suction and discharge air vessels maintaining elastic air cushions in the closest possible proximity to the valves to ensure an even flow of liquid in the pump piping and to reduce shock due to the rapid movements of the valves.

But in order that the invention may be more readily understood it will now be further described with the aid of the accompanying drawings, of which Fig. 1 is a sectional elevation of one half of a horizontally arranged twin cylinder pump showing one constructional arrangement, the section being a central vertical section. Fig. 2 is a plan corresponding thereto. Figs. 3 and 4 are central sections of two modifications for application to a vertical pump cylinder.

Referring first to Figs. 1 and 2, *a* represents a pedestal body within which works the enlarged portion *b* of a plunger *c* adapted to be reciprocated in any convenient way, as from a connecting rod *c'*. *d* is the pump casing which is attached by the portion e, to the pedestal a and is formed with a partition f, the said casing being so shaped that a delivery air chamber g and suction air chamber h are provided. i is the integral valve member referred to, j being the elastic rings which are seated in exterior angular grooves and cooperate with liquid delivery slits k, whilst m are the elastic rings seated in interior angular grooves and cooperate with the suction slits n. The course of the liquid from the inlet branch o to the outlet branch p is indicated by the arrows. As will be seen, the member i is formed intermediate of its length with a collar q adapted to be tightly held against a recessed portion $f^1$ of the partition f by means of a cover r that serves to effect a tight joint between the member i and the opening in the casing d through which it is inserted. The end s of the member i is turned internally to fit the plunger c and externally to fit the portion t of the casing d, the said portion s constituting the bottom of a stuffing box u completed by a gland $u^1$.

In Fig. 3, the valved member i is adapted to be inserted in a pump casing $d^1$, having suction and delivery branches $o^1$, $p^1$, from the driving end, the stuffing box $u^2$ being in this case incorporated in the cover $r^1$ independently of the member i, and a circular perforated or wire gauge strainer v being fitted around the suction valve seating. Fig. 4 illustrates a further modification which, from the description given regarding Figs. 1 and 3, will be self explanatory, $p^2$ in this case being the outlet branch and $o^2$ the inlet branch.

Inlet valves of the type herein described may be used with delivery valves of a different type to that described and shown.

What I claim is:—

1. In a reciprocating pump, a hollow cylindrical member internally grooved and having slits arranged circumferentially in such grooves, and elastic members of annular form located in said grooves and working compressively as suction valves, substantially as described.

2. In a reciprocating pump, a hollow cylindrical member formed with internal grooves of angular shape in cross section and having circumferential slits in the bottom of the grooves and elastic members of annular form located in said grooves and working compressively as suction valves, substantially as described.

3. In a reciprocating pump, a pump casing having a suction branch and a delivery branch and provided with a partition between said branches, such partition being formed with an opening, a hollow member formed with an external collar intermediate of its length and adapted to be inserted in the pump casing with the collar aforesaid abutting tightly against the partition, said member being cylindrical and internally grooved to one side of the partition and having slits arranged circumferentially in said grooves, and elastic members of annular form located in said grooves and working compressively as suction valves, substantially as described.

4. In a reciprocating pump, a pump casing having a suction branch and a delivery branch and provided with a partition between said branches, such partition being formed with an opening, a hollow member formed with an external collar intermediate of its length and adapted to be inserted in the pump casing with the collar aforesaid abutting tightly against the partition, said member being cylindrical and internally grooved to one side of the partition and having slits arranged circumferentially in said grooves, elastic members of annular form located in said grooves and working compressively as suction valves, said hollow member having delivery openings at the opposite side of said partition and delivery valve means controlling said delivery openings.

5. In a reciprocating pump, a pump casing having a suction branch and a delivery branch and formed with a partition between said branches dividing such casing into two air chambers, said casing being formed with three aligned openings, one in the partition, a smaller one to one side thereof and a larger one to the opposite side thereof, a hollow member having a collar intermediate of its length adapted to make contact with the partition, an end adapted to fit the smaller opening in the casing and an end adapted to fit the largest opening, said smaller end being internally bored, a plunger adapted to be reciprocated in said bored end, a gland adapted to fit the smallest opening in the casing, and form with the same, the smaller end of the hollow member and the plunger, a stuffing box for the latter, a cover applied to the largest opening in the casing adapted to hold the hollow member securely with its collar in engagement with the partition, the portion of the hollow member between the partition and the cover being internally grooved and having slits arranged circumferentially in such grooves, elastic members of annular form located in said grooves and working compressively as suction valves and delivery valve means provided upon the casing between the partition and the cover at the opposite end of the pump casing, substantially as described.

6. In a reciprocating pump, the combination with a casing having a perforated partition dividing it into suction and delivery chambers, of a hollow cylindrical member extending through such partition and in fluid tight connection therewith, said member being at one side of the partition internally grooved and having slits arranged circumferentially in such grooves and being at the opposite side of the partition externally grooved, and similarly slotted, annular elastic members in the internal grooves working compressively as suction valves and annular elastic members in the external grooves working under tension as delivery valves, substantially as described.

Signed at London, England, this twenty-eight day of February 1921.

JÖRGEN BJÖRNSTAD.